United States Patent [19]

Michiuchi

[11] 4,425,977
[45] Jan. 17, 1984

[54] AIR CLEANER SYSTEM FOR MOTORCYCLE ENGINE

[75] Inventor: Masayuki Michiuchi, Kamifukuoka, Japan

[73] Assignee: Honda Giken Kogyo Kabushiki Kaisha, Tokyo, Japan

[21] Appl. No.: 334,563

[22] Filed: Dec. 28, 1981

[30] Foreign Application Priority Data

Jan. 17, 1981 [JP] Japan ................................ 56-5078[U]
Jan. 17, 1981 [JP] Japan ................................ 56-5079[U]
Jan. 17, 1981 [JP] Japan ................................ 56-5080[U]

[51] Int. Cl.³ .............................................. B62J 17/06
[52] U.S. Cl. .................................... 180/225; 55/385 B
[58] Field of Search ............................. 180/225, 219; 55/DIG. 28, 385 B, 385 R

[56] References Cited

FOREIGN PATENT DOCUMENTS 531638 9/1953 Belgium .............................. 180/225
505184 12/1954 Italy ................................... 180/225

Primary Examiner—John A. Pekar
Assistant Examiner—D. Lynn Fugate
Attorney, Agent, or Firm—Lyon & Lyon

[57] ABSTRACT

An motorcycle has a body frame supporting an engine and provided with a seat. A leg shield on the body frame covers the front of the lower legs of a rider sitting on the seat. A main pipe of the body frame extends between the leg shield and the seat. An air cleaner for the engine has suction ports located on the internal side of the leg shield facing the seat, in order to exclude from the suction ports ram air produced by forward motion of the motorcycle. Two intake pipes straddle the main pipe and connect the suction ports to the air cleaner.

6 Claims, 6 Drawing Figures

AIR CLEANER SYSTEM FOR MOTORCYCLE ENGINE

This invention relates to an air cleaner system for an internal combustion engine mounted on the frame of a motorcycle.

Motorcycles provided with a shield for protecting the lower front portions of the legs of the rider may have a space in front of the leg shield and below the main pipe of the body frame in which to mount an air cleaner for the engine carburetor. However, ram air produced by forward motion of the motorcycle would adversely affect engine performance if the intake for the air cleaner were to be located in front of the leg shield.

It is generally desired, in order to stabilize the output of the internal combustion engine and to reduce suction noise, to employ an air cleaner with as large a capacity as possible and to improve the suction efficiency by isolating its suction ports from the effect of ram air. It is, therefore, the primary object of this invention to provide an air cleaner system for a motorcycle engine adapted to utilize the dead space forward of the leg shield and below the main pipe of the body frame, and to locate the suction ports of the air cleaner on the interior side of the leg shield facing the rider's seat.

Other and more detailed objects and advantages will appear hereinafter.

Figure 1:
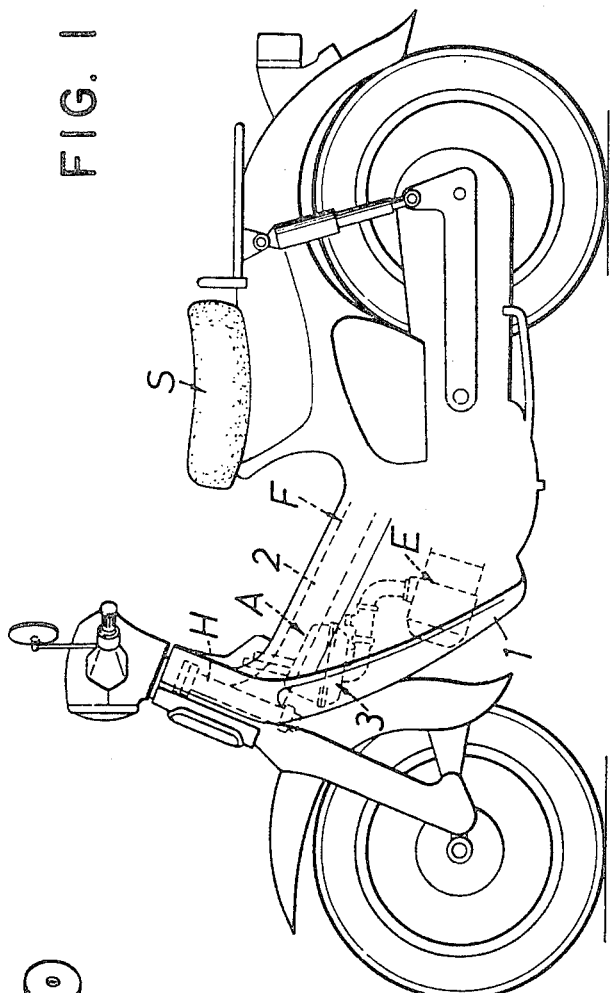
FIG. 1 is a side elevation of a motorcycle, the apparatus comprising this invention being shown in dotted lines.

Referring to the drawings, a leg shield 1 is provided for covering the front of the lower half of the legs of a rider sitting on the seat S mounted on the motorcycle body frame F. The legs of the rider straddle the main pipe 2 of said body frame F. An internal combustion engine E is mounted on the body frame F to the rear of the leg shield 1. An air cleaner A connected to the intake system of the internal combustion engine E is disposed in a space D formed under the main pipe 2. The main pipe 2 runs longitudinally between the leg shield 1 and the seat S and above the engine E.

Figure 5:
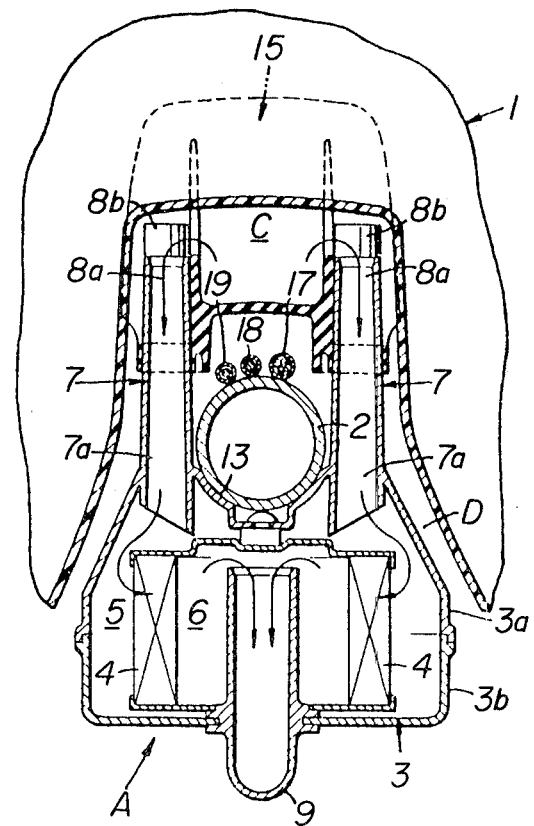
FIG. 5 is a sectional detail taken substantially on the lines 5—5 as shown on FIG. 3.
Figure 4:
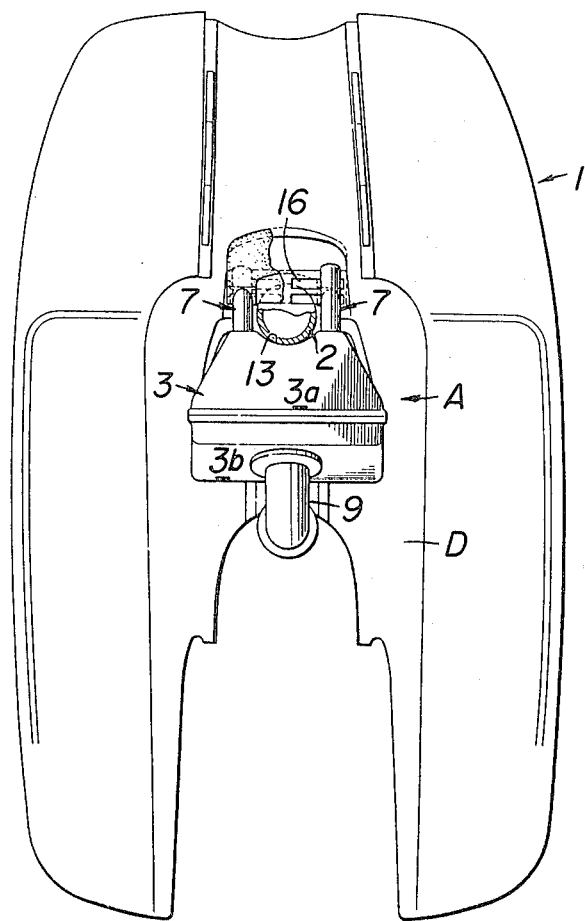
FIG. 4 is a view taken substantially on the lines 4—4 as shown on FIG. 2.
Figure 6:
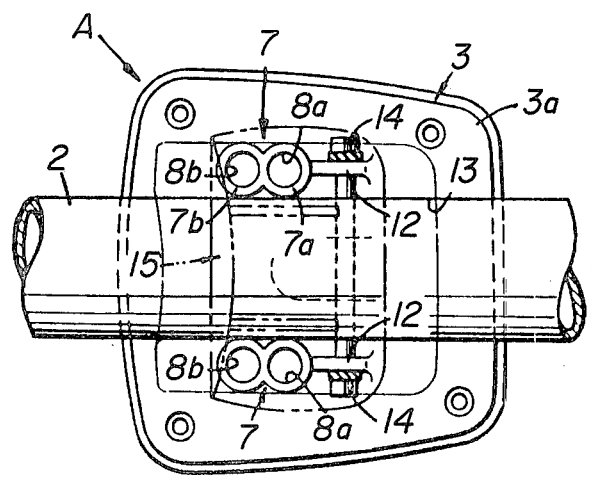
FIG. 6 is a detail, partly in section, taken substantially on the lines 6—6 as shown on FIG. 3.

The case 3 of the air cleaner A comprises an upper case half 3a and a lower case half 3b connected to each other. A cleaner element 4 is housed in the cleaner case 3, the cleaner element 4 dividing the cleaner case 3 into two chambers, an upstream chamber 5 into which uncleaned air flows, and a downstream chamber 6 into which cleaned air flows after passing through the cleaner element 4. On the upper case half 3a, as best shown in FIGS. 5 and 6, a pair of air intake pipes 7, 7 spaced left and right, extend upward in the form of a fork, each air intake pipe 7 comprising two air intake passages 7a, 7b placed side by side to form the shape of a numeral 8 in cross section. One intake passage 7a of each pair of intake pipes 7 is formed somewhat shorter than the other air intake passage 7b, so that a difference in height is formed between their suction ports 8a and 8b, providing easier suction of air through the two suction ports 8a, 8b. The inner end of the air intake pipe is connected to the upstream chamber 5 in the air cleaner case 3. A flexible air delivery pipe 9 is connected to the lower case half 3b, the inner end of said pipe 9 being connected to the downstream chamber 6 of the air cleaner case 3, and the outer end thereof being connected to an intake pipe 11 of the internal combustion engine E through a carburetor 10.

Mounting lugs 12, 12 on the upper case half 3a are formed integrally with the pair of intake pipes 7, 7, and, as shown in FIG. 5, the upper part of the upper case half 3a is shaped as a semi-cylindrical cavity 13 between said pairs of intake pipes 7 and 7 so as to fit the outer surface of said main pipe 2.

The air cleaner A constructed as above described runs longitudinally under the main pipe 2 between the leg shield 1 and the seat S, suspended from and supported by the main pipe 2. The supporting structure includes the semi-cylindrical cavity 13 of the upper case half 3a located along the lower surface of the main pipe 2. The pair of intake pipes 7, 7 and the mounting lugs 12, 12 which are integral therewith are positioned at both sides of the main pipe 2 so as to straddle it. The mounting bolt 14 extends through the mounting lugs 12, 12 and through the main pipe 2. When tightened, the bolt 14 secures the air cleaner A firmly to the main pipe 2.

Thus, the air intake passages 7a, 7b of the pair of intake pipes 7, 7 are located on the rear side of the leg shield 1 that faces the seat S, so that pressure of the wind caused by forward motion of the motorcycle does not drive air directly into the air cleaner A. A cover 15 made of rubber or other resilient material is mounted over the left and right air intake pipes 7, 7. Together with the air cleaner A, said cover 15 is tightened and fixed to the main pipe 2 with the mounting bolt 14.

Figure 2:
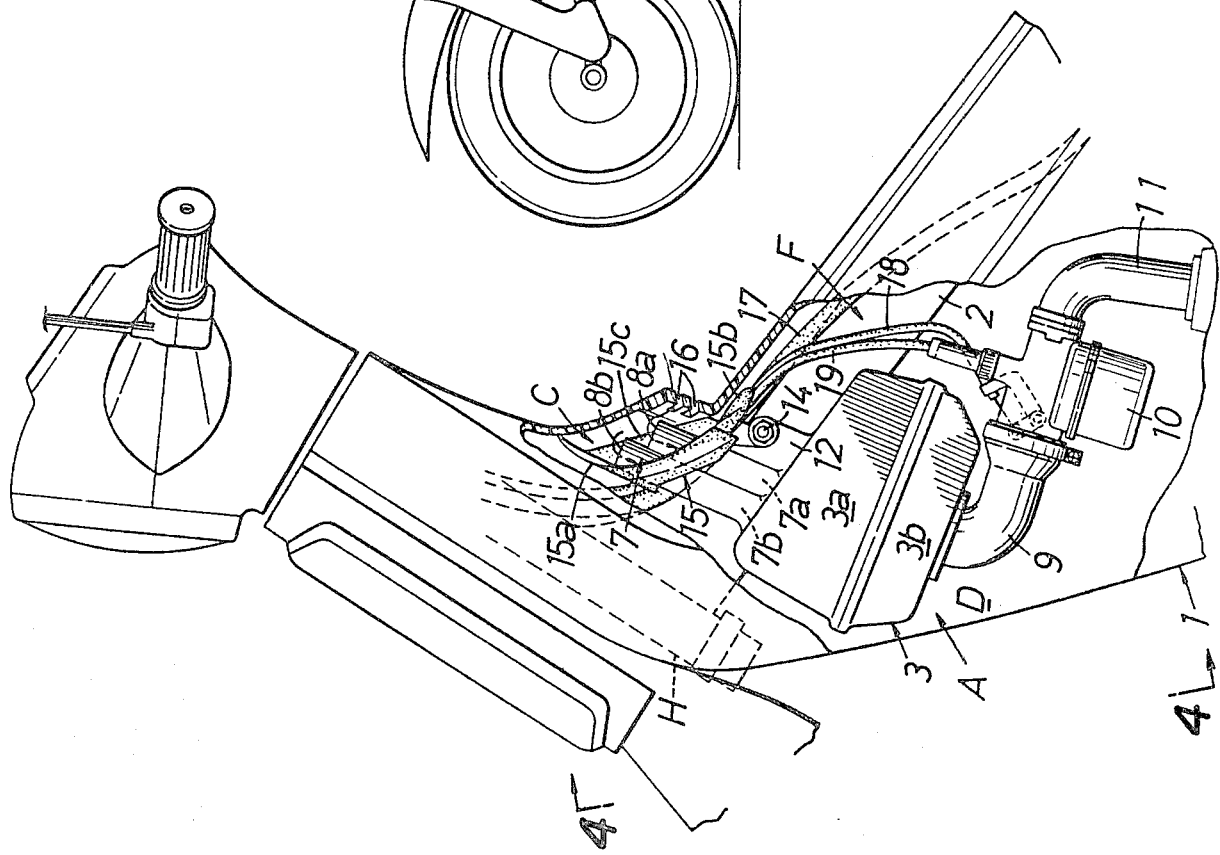
FIG. 2 is an enlargement of a portion of FIG. 1, partly in section and partly broken away.
Figure 3:
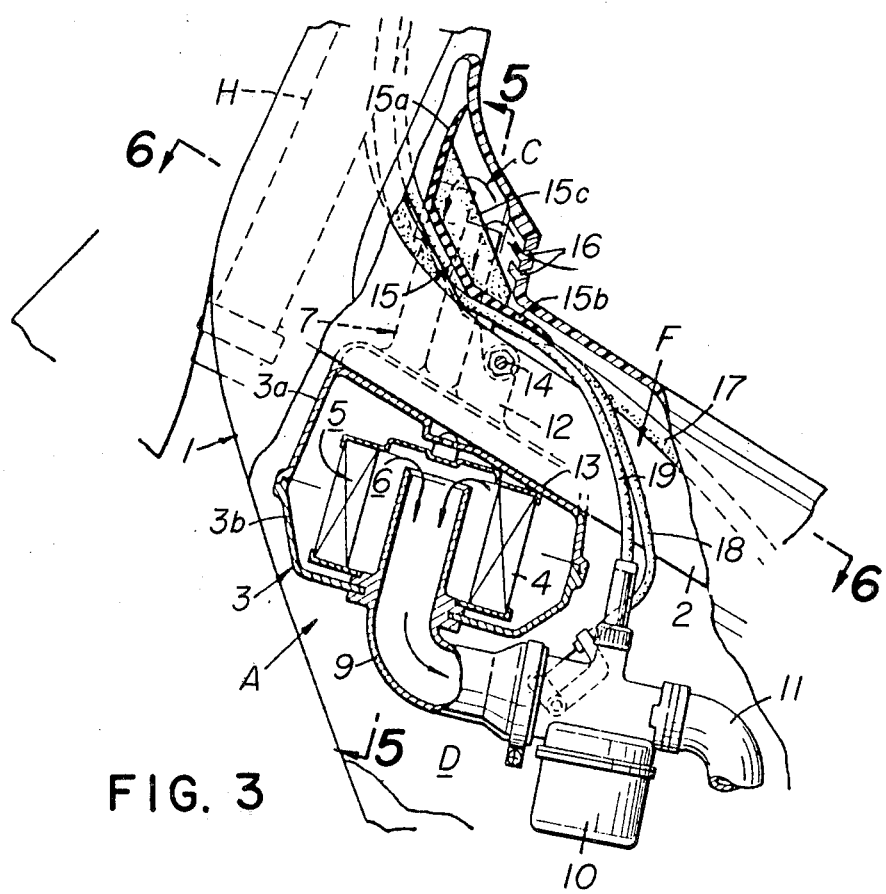
FIG. 3 shows a portion of FIG. 2 on an enlarged scale and with certain additional parts shown in section.

As shown in FIGS. 2 and 3, the cover 15 is formed integrally with a screening plate 15a extending vertically for screening the front open ends of the suction ports 8a, 8b of the left and right air intake pipes 7, 7. A holding piece 15b extends along the upper surface of the main pipe 2, the screening plate 15a and the holding piece 15b being reinforced with a rib 15c. During forward motion of the motorcycle, the wind which would pass over the suction ports 8a, 8b is screened by the screening plate 15a, so that the suction ports 8a, 8b do not directly receive ram air from the wind. Also, the holding piece 15b, in cooperation with the main pipe 2, holds for protection cables including a wire harness 17, a choke cable 18, and a throttle cable 19. As thus held in place, these parts do not shift on the main pipe 2.

Part of the leg shield 1 extends to the rear side of a head pipe H of the body frame F so as to cover the left and right air intake pipes 7, 7 of the air cleaner A. Accordingly, the air inflow chamber C of the closed type covering the surroundings of the left and right air intake pipes 7, 7 is formed with part of the leg shield 1 and the cover 15. The air inflow chamber C communicates with the outside through a plurality of communication ports 16 provided in the leg shield 1.

In operation, the internal combustion engine E drives the motorcycle, and its intake vacuum acts on the air cleaner A through the carburetor 10, and, as shown in FIGS. 3 and 5, the air passes through the communication ports 16 and then flows into the air inflow chamber C. From there the air flows through the left and right air intake pipes 7, 7 into the upstream chamber 5 of the air cleaner case 3. Uncleaned air in the upstream chamber 5, after it has been cleaned by passing through the cleaner element 4, flows into the downstream chamber 6, and from there flows through the air extraction pipe 9, carburetor 10, and intake pipe 11 to the internal combustion engine E.

Since the suction ports 8a, 8b of each air intake pipe 7 of the air cleaner A open onto the rearward side of the leg shield 1 that faces the seat S, the suction ports 8a, 8b do not directly receive ram air from the wind generated by forward motion of the motorcycle, and therefore can provide high suction efficiency. The relatively large dead space D is formed between the leg shield 1 and the lower surface of the main pipe 2, so that the air cleaner A can be relatively large in capacity.

As seen from the foregoing, in accordance with this invention, the air cleaner is provided along the lower part of the main pipe of the body frame which runs longitudinally between the leg shield and the seat. In this way a relatively large air cleaner can be disposed in a compact manner along the head pipe in a dead space formed between the leg shield and the lower part of the main pipe. This makes it possible to stabilize the output of the internal combustion engine and to reduce the suction noise of the air cleaner, and in addition the air cleaner itself is protected by the main pipe and the leg shield.

The air intake pipes of the air cleaner are placed along the main pipe, with their suction ports located on the internal side of the leg shield that faces the seat, so that the suction ports of the intake pipes will be little affected by the ram effect of the wind caused by forward motion of the motorcycle, thereby enabling the suction efficiency to achieve a substantial improvement.

Having fully described my invention, it is to be understood that I am not to be limited to the details herein set forth but that my invention is of the full scope of the appended claims.

I claim:

1. In a motorcycle having a body frame with a seat, said frame supporting an engine, the improvement comprising, in combination: a leg shield on said body frame adapted to cover the front of the lower portions of the legs of a rider sitting on said seat, the body frame having a main pipe extending longitudinally between said leg shield and said seat, an air cleaner for said engine and having a suction port located on the internal side of said leg shield facing said seat, in order to exclude from said suction port ram air produced by forward motion of the motorcycle.

2. In a motorcycle having a body frame with a seat, said frame supporting an engine, the improvement comprising, in combination: a leg shield on said body frame adapted to cover the front of the lower portions of the legs of the rider sitting on said seat, the body frame having a main pipe extending longitudinally between said leg shield and said seat, an air cleaner for said engine and having two suction ports located on the internal side of said leg shield facing said seat, in order to exclude from said suction ports ram air produced by forward motion of the motorcycle, and two intake pipes straddling said main pipe and connected to said two suction ports.

3. In a motorcycle having a body frame with a seat, said frame supporting an engine, the improvement comprising, in combination: a leg shield on said body frame adapted to cover the front of the lower portions of the legs of the rider sitting on said seat, the body frame having a main pipe extending longitudinally between said leg shield and said seat, an air cleaner for said engine and having two suction ports located on the internal side of said leg shield facing said seat, a communication port being provided on said leg shield facing said seat and being in fluid communication with said two suction ports, in order to exclude from said suction ports ram air produced by forward motion of the motorcycle, and two intake pipes straddling said main pipe and connected to said two suction ports.

4. The combination set forth in claim 3 in which each of said two intake pipes comprises two air intake passages placed side by side, one of said intake passages being formed shorter than the other intake passage so as to locate its suction port at a lower elevation.

5. The combination set forth in claim 3 in which a cover of resilient material is mounted over said intake pipes and formed integrally with an upward extending screen for screening the front open ends of said suction ports.

6. The combination set forth in claim 5 in which said cover cooperates with said leg shield to form a closed air flow chamber around said intake pipes, said chamber communicating with atmosphere through a communication port provided in said leg shield.

* * * * *